Dec. 11, 1951     J. HARR     2,578,544
MULTIPLE LIQUID DISPENSING VALVE

Filed July 10, 1948

Jesse Harr    Inventor

By Peter J. Gaylor Attorney

Patented Dec. 11, 1951

2,578,544

UNITED STATES PATENT OFFICE 2,578,544

MULTIPLE LIQUID DISPENSING VALVE

Jesse Harr, South Orange, N. J.

Application July 10, 1948, Serial No. 37,997

1 Claim. (Cl. 251—134)

This invention relates to dispensing valves. More specifically, it deals with a multiple fluid control valve particularly adapted for dispensing several liquids of different viscosities.

Figure 1:
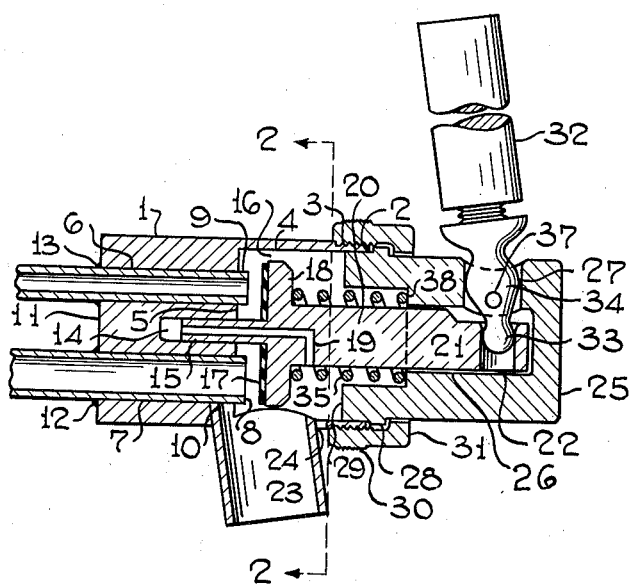
Figure 2:
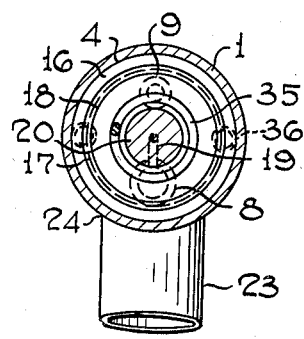

The invention may be more readily understood by reference to the drawing in which Figure 1 shows a cross-sectional side view of one embodiment of the present invention. A cross-sectional front view, looking to the left of Figure 1 along 2—2, is depicted in Figure 2. Similar numbers refer to similar parts in the figures.

Referring again to the drawing, numeral 1 represents the body of the valve having protruding housing portion 2, threaded on the outside at 3. The thicker portion or base of body 1 is provided with holes 6, 7, into which are inserted straight tubes or leads having ends 8 and 9 protruding beyond inner face 5 of the body base. These leads are welded or otherwise sealed to body 1 at 12 and 13, so that no liquid may escape therethrough.

Centrally disposed hole 14 is also provided in inner face 5 to house guide pin 15 attached to valve 18 which is preferably circular and of diameter large enough to adequately cover the openings in protruding ends 8 and 9 of the leads through which the fluids are fed under pressure. The size of the holes in ends 8 and 9 may be varied, depending upon the viscosity of the fluid and the proportion thereof to be metered therethrough, the larger opening being used mainly for the more viscous fluids.

Valve 18 is provided on its bottom portion with gasket 17 to insure adequate seating on flat ground surfaces of ends 8 and 9. Also, valve 18 is provided with protruding upper stem 20, the end portion 21 of which is provided with hole 22 for accommodating toggle end 33 of handle 32, employed for reciprocating stem 20, using wall 27 of the opening in bonnet 25 as a thrust member. A removable pin (not shown) is inserted through the wall of bonnet 25 and hole 37 to hold handle 32 in place and also act as a pivot therefor.

Helical spring 35 is coiled around stem 20. One end rests against inner shoulder 38 in bonnet 25, while the other end impresses a thrust upon valve 18, tending to keep it in closed position, butting against lead ends 8 and 9. As can be seen from the drawing, bonnet 25 is provided with inner hole 26 for accommodating reciprocating stem 20. End 29 of the bonnet fits inside of housing portion 2, while lip 28 is provided as a stop to prevent bonnet 25 from entering too far into housing 2. The bonnet is held tightly on housing 2 by means of coupling 30 having inner threads engaging outer threads 3 on housing 2, as well as protruding lip 31 fitting over lip or shoulder 28 on bonnet 25.

Discharge outlet 23 is disposed in housing 2 as close to face 5 as possible to insure drainage of all liquid. In fact, it is preferred to undercut face 5 at 10 to insure drainage into outlet 23. A hole 19 is provided in guide pin 15 to facilitate drainage of fluid out of hole or well 14, through a portion of stem 20, into housing 2. Threaded holes 36 are provided in the front of body 1 to allow mounting of the valve on a panel or bar.

In the operation of the valve, tube end 9, having the smaller diameter, is connected to a supply of carbon dioxide-charged water under pressure, for example, while the large sized lead may be connected to a reservoir containing flavored syrup, fed thereto by syphonic action, pressure, or in any other manner. Syphonic action has been suitable for most purposes.

When handle 32 is pushed to the left (as in Fig. 1) valve 18 is pulled away from the openings in ends 8 and 9, and spring 35 is compressed. Both soda water and syrup flow through their respective openings and swirl in annular space 16 which serves as a mixing chamber, thereby making the valve self-cleaning, and the mixed liquid drains through outlet 23. When pressure on handle 32 is released, spring 35 forces valve 18 over the openings in ends 8 and 9 and thus stops the flow therethrough.

It will be observed that with the tube ends 8 and 9 raised above face 5 of body 1, gasket 17 seats solidly upon ends 8 and 9 without any interference from any caked solids or residue which may form on face 5. It is possible to separate valve 18 from stem 20, allow valve 18 to float thereon and thus be able to rotate freely thereon, so that gasket 17 does not become worn out unevenly.

Also, it is possible to employ a solenoid around stem 20 (of magnetic material) and operate valve 18 by the solenoid. A solenoid may also be fixed to handle 32 so as to pull it rather than rely on manual operation.

The body construction affords unique assembly features in that the leads (with ends properly faced) may be inserted through holes 6 and 7 to the required distance and soldered at the outlets 12 and 13 in a simple operation in a jig, thereby eliminating considerable lathe work.

Handle 32 may be disposed in any position (for right or left hand operators), as long as it is held in a plane at right angles to the main axis of the valve.

Tests made on valves of this type show that the use of the structure described herein, including the protruding tube ends 8 and 9, causes the formation of a vacuum during fluid flow, which facilitates removal of fluids from their respective continers. The valve of the type described is suitable for hot and cold liquids as well as acidic products, soups, and the like.

It is preferred to employ close fits for rod 15 in well 14 and stem 20 in well 26, in which case the well walls act as guide bearings and thus facilitate rod movement and also act to seal off liquid.

By means of the present construction, any number of openings may be disposed around well 14. For example, it is possible to employ a lead for each of a series of flavored syrups and shutoff controls may be provided in said leads outside of the valve body to allow selection of the desired flavors. Provision may be made also to allow shutting off of all flavor openings when the valve handle 32 is returned to closed position.

Another variation which may be employed is to connect hole 6 with well 14 and mount a Schraeder type air valve in the dead end of well 14 with a release pin projecting through straight opening 19, through stem 21 and connected to toggle 33. This valve is ordinarily closed until handle 32 is pulled to the right a few degrees (after valve 18 is closed), whereupon the Schraeder valve becomes open and soda water may be sprayed through outlet 23 in the form of a fine stream to provide the "head" on the dispensed beverage.

Other important features of this invention include a sanitary outside thread system and simplicity in assembly and dis-assembly for cleaning and replacement of parts.

I claim:

In a dispensing valve for several fluids comprising a body portion having an inner face provided with multiple inlet fluid openings disposed through said face and over which face a flat valve is disposed, and an open hollow housing projecting from said body portion, the improvement comprising a centrally disposed well projecting from said face into said body, a guide pin having a free end and another end fitting and sliding in said well, the flat valve being centrally mounted on the free end of said pin, said multiple inlet fluid openings being disposed around said well, serving to lead fluids into said housing, which openings are closed off when the valve slides and seats against said openings, a centrally disposed stem projecting from said valve and oppositely disposed to said pin, a bonnet fitting over and covering the housing opening and having a centrally disposed well for accommodating said projecting valve stem and having an inner shoulder around said valve stem and facing said valve, removable holding means for holding said bonnet tightly to said housing, a coil spring disposed around said valve stem and imposing a thrust against said bonnet shoulder and said valve, thus tending to keep the valve in closed position, pulling means for pulling on the end of stem to enable opening of the valve, an outlet opening disposed in the side of said housing adjacent said face for egress of fluids dispensed, and straight tubes inserted through said fluid openings and projecting from the facing, providing adequate seating over the projecting ends thereof, the other ends of said tubes projecting from the body for a sufficient distance to enable coupling with fluid feed lines.

JESSE HARR.

REFERENCES CITED

The following references are of record in the file of this patent:

UNITED STATES PATENTS

| Number | Name | Date |
| --- | --- | --- |
| 665,357 | Ackerman | Jan. 1, 1901 |
| 973,914 | Gaffery | Oct. 25, 1910 |
| 1,178,307 | Ford | Apr. 4, 1916 |
| 1,545,821 | Eubanks | July 14, 1925 |
| 1,837,552 | Kelly | Dec. 22, 1931 |
| 1,848,172 | Hengesbach | Mar. 8, 1932 |
| 1,976,578 | Pierce | Oct. 9, 1934 |
| 2,125,102 | Cornelius | July 24, 1938 |
| 2,210,616 | Clarke | Aug. 6, 1940 |
| 2,324,150 | Groomes | July 13, 1943 |
| 2,417,546 | DeGiers | Mar. 18, 1947 |

FOREIGN PATENTS

| Number | Country | Date |
| --- | --- | --- |
| 7,016 | Great Britain | of 1905 |
| 169,205 | Great Britain | of 1920 |
| 415,990 | Great Britain | of 1934 |